C. L. NOÉ.

BOBBIN WINDER FOR SEWING-MACHINE.

No. 7,205. Reissued July 4, 1876.

WITNESSES:

C. Neveux

Alex F. Roberts

INVENTOR:

C. L. Noé.

BY

ATTORNEYS.

UNITED STATES PATENT OFFICE.

CHARLES L. NOÉ, OF BERGEN POINT, NEW JERSEY.

IMPROVEMENT IN BOBBIN-WINDERS FOR SEWING-MACHINES.

Specification forming part of Letters Patent No. 174,429, dated March 7, 1876; reissue No. 7,205, dated July 4, 1876; application filed May 1, 1876.

*To all whom it may concern:*

Be it known that I, CHARLES L. NOÉ, of Bergen Point, in the county of Hudson and State of New Jersey, have invented a new and Improved Bobbin-Winder, of which the following is a specification:

The invention consists in hinging the guide and spring-held presser-roll of a bobbin-winder to facilitate the putting in and taking out of the bobbin.

Figure 1:
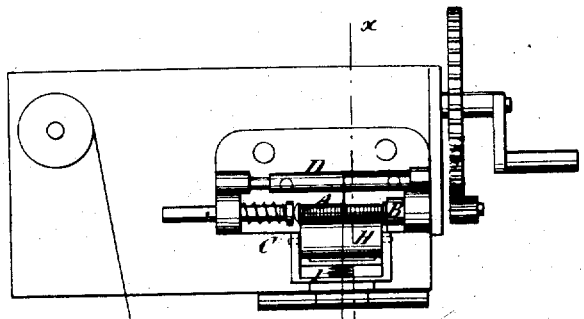
Figure 2:
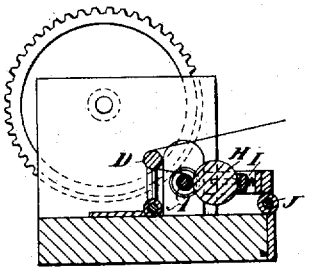
Figure 3:
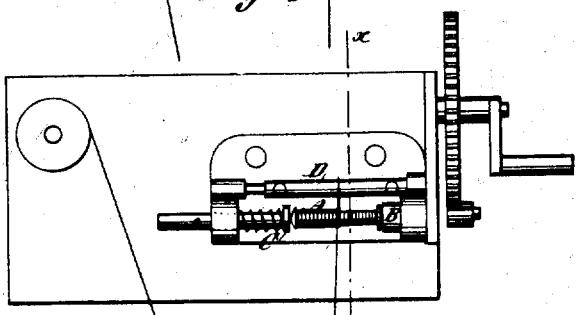
Figure 4:
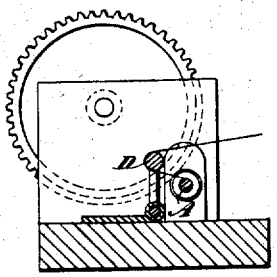
Figure 4:
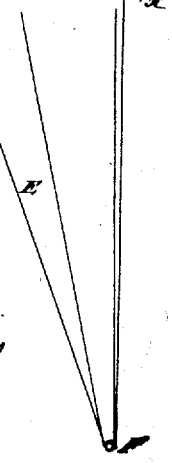

Figure 1 is a plan of a bobbin-winder, showing the improved guide used in connection with a roller-presser. Fig. 2 is a section of Fig. 3 on line *x x*. Fig. 3 is a plan of a bobbin-winder, showing the use of the guide without a presser; and Fig. 4 is a transverse section of Fig. 3 on line *x x*.

Similar letters of reference indicate corresponding parts.

A is the bobbin, which turns in centers B C in the ordinary way, and by any approved means. D is the improved hinged guide of my invention, the same being a smooth round rod of good size to afford ample bearing-surface for the thread, and a little longer than the bobbin, and being arranged parallel with the bobbin on either side, so as to run the thread over it from the operator's finger; or it may run over a guide-stud, F, in the position where the operator would naturally hold his hand, passing beyond the bobbin, around the guide, and back to the bobbin, so that it has freedom to be traversed forward and backward along the guide by the lateral pressure of the coils on the thread at the point where it begins to wind on the bobbin. The traverse motion of the thread is reversed at the ends of the bobbin by its cheeks, as where other guides are used. H is a roller-presser, which may be used for the purpose of bearing on the bobbin, to prevent the thread from running back on the coils, and to aid in laying the coils smoothly, said roller being held in contact with the bobbin by a spring, I, which allows it to recede as the size of the bobbin increases, and also being arranged on hinges J, to be swung back out of the way when putting in and taking out the bobbin.

Having thus described my invention, I claim as new and desire to secure by Letters Patent—

1. The combination, with the bobbin-centers B C, of a plain guide, D, mounted on a hinged or pivoted support, and arranged parallel to them, substantially as specified.

2. The combination, with hinged guide D, of presser-roll H, having spring I and hinge J, as and for the purpose specified.

CHARLES L. NOÉ.

Witnesses:
T. B. MOSHER,
ALEX. F. ROBERTS.